United States Patent [19]

Sumner

[11] Patent Number: 4,560,607
[45] Date of Patent: Dec. 24, 1985

[54] METHOD OF JOINING MATERIALS BY MECHANICAL INTERLOCK AND ARTICLE

[75] Inventor: Earl C. Sumner, Tipp City, Ohio

[73] Assignee: The Duriron Company, Inc., Dayton, Ohio

[21] Appl. No.: 618,422

[22] Filed: Jun. 7, 1984

[51] Int. Cl.$^4$ .......................... B32B 3/10; B32B 7/04; B32B 31/00

[52] U.S. Cl. .................................... 428/141; 156/276; 156/298; 264/274; 428/147; 428/161; 428/323; 428/327

[58] Field of Search ........................ 156/276, 297, 298; 264/274; 428/141, 142, 147, 161, 162, 323, 327

[56] References Cited

U.S. PATENT DOCUMENTS

| | | | |
|---|---|---|---|
| 572,454 | 12/1896 | Shelmerdine | 52/311 |
| 1,516,890 | 11/1924 | Pochin | 428/67 |
| 2,768,923 | 10/1956 | Kepple et al. | 428/323 |
| 3,029,475 | 4/1962 | Bastone | 264/53 |
| 3,126,311 | 3/1964 | Harris | 428/147 |
| 3,630,821 | 12/1971 | Miller et al. | |
| 4,035,547 | 7/1977 | Heller, Jr. et al. | 428/323 |
| 4,045,603 | 8/1977 | Van Smith | 428/147 |
| 4,239,797 | 12/1980 | Sachs | 428/147 |
| 4,254,180 | 3/1981 | Kline | 428/323 |
| 4,460,635 | 7/1984 | Jones et al. | 428/142 |

Primary Examiner—William J. Van Balen
Attorney, Agent, or Firm—St. Onge, Steward, Johnston & Reens

[57] ABSTRACT

Joining together two materials by a mechanical interlock resulting from "chips" at their interface is disclosed. The chips, composed of one of the two materials to be joined or of a third material are partially embedded into the surface of the first material when that material is formed so as to form surfaces which "overhang" the first material. Thereafter, the second material is formed against the overhanging surfaces of the chips to establish the mechanical interlock. This technique is particularly useful in anchoring a dissimilar material to a polymeric material having poor bondability and/or a high melt temperature, for example fluoropolymers, as illustrated by the forming of a liner for a pump casing, or the like, by rotational molding. In that illustration, small particles and chips are distributed uniformly over the surface of an enclosed mold heated to melt the particles and fuse the chips thereto, and cooled to form a layer with the chips projecting therefrom so as to provide an interlock when a casing is formed against the liner. Other aspects of the present invention include the article of manufacture formed by the above method.

24 Claims, 12 Drawing Figures

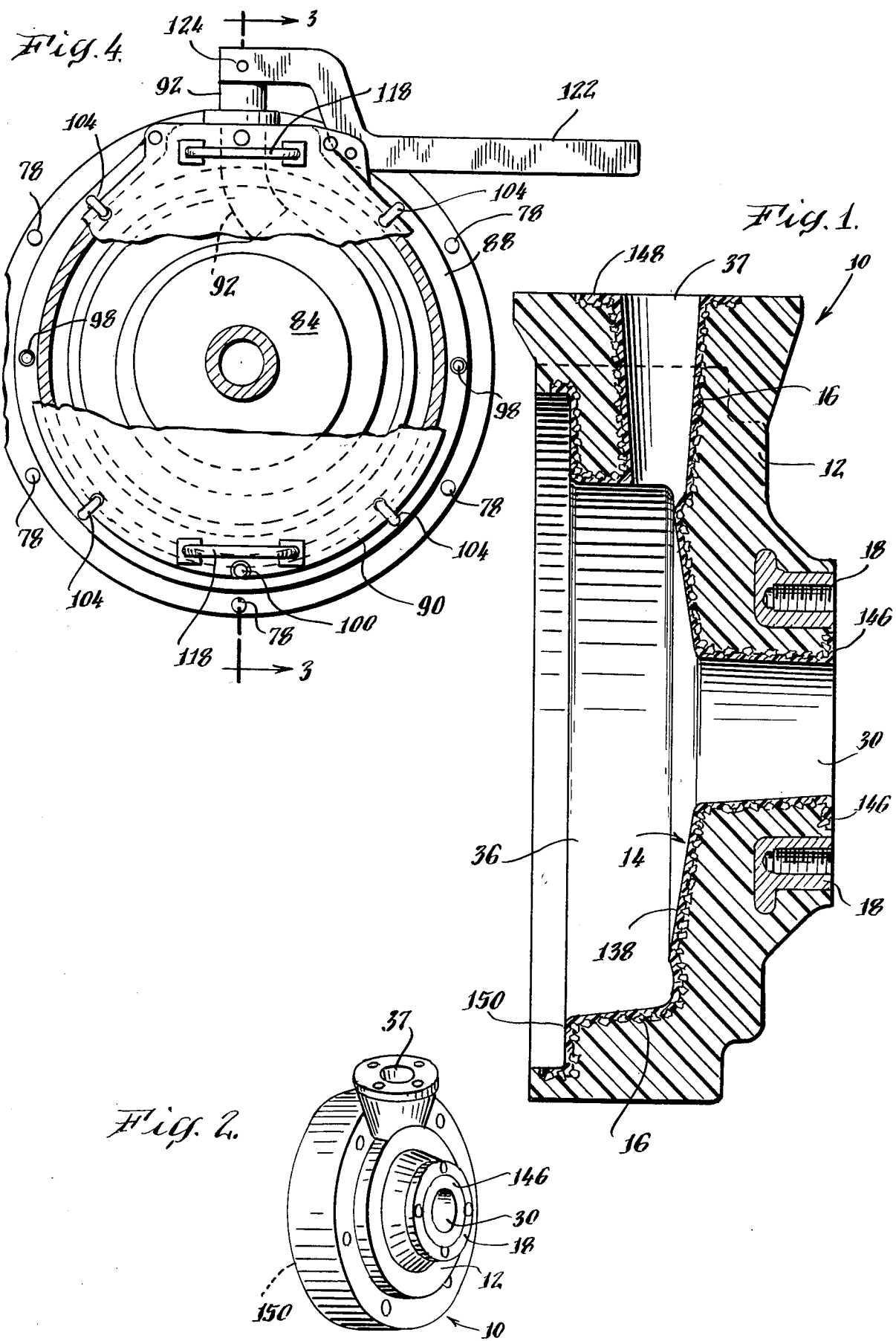

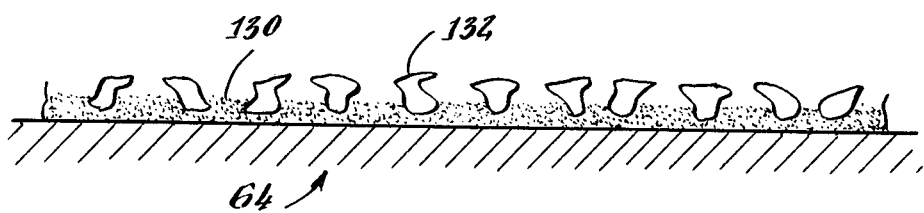
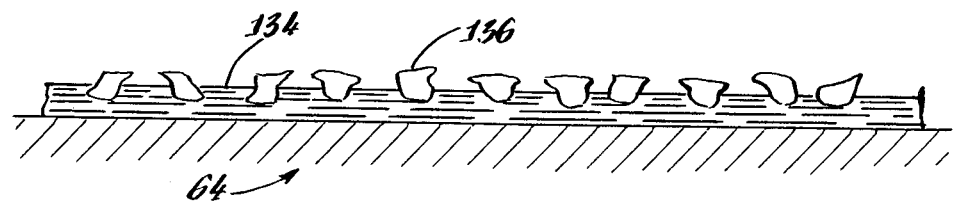
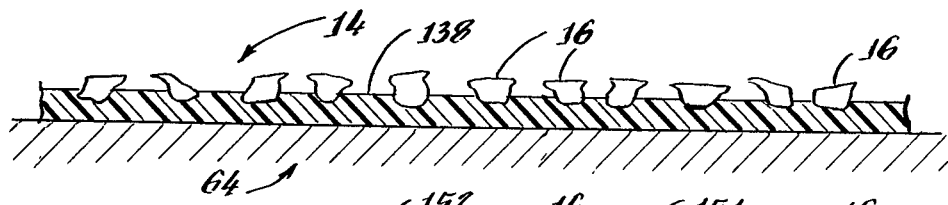
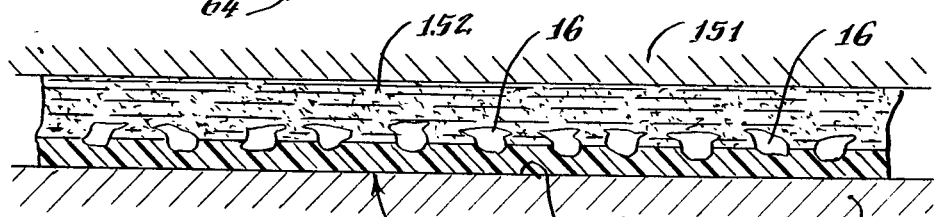
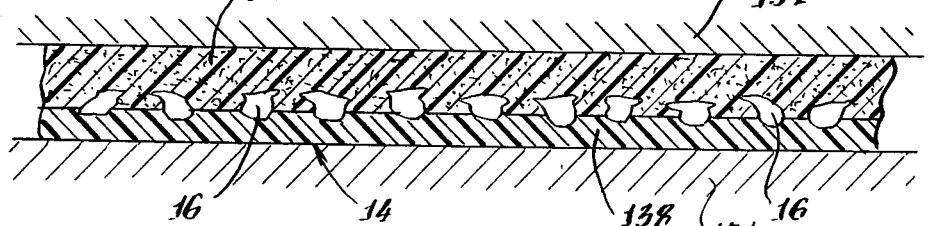
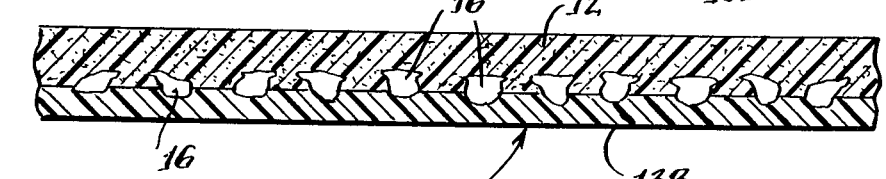
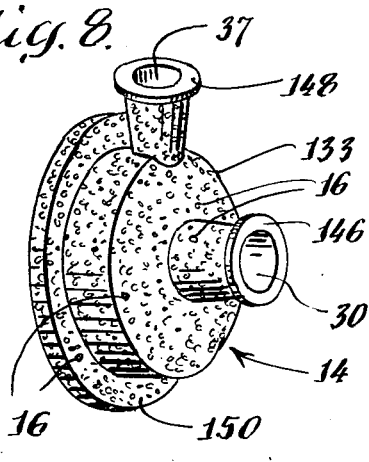
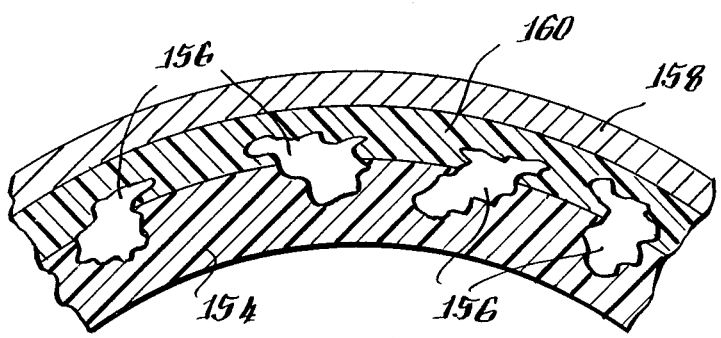

METHOD OF JOINING MATERIALS BY MECHANICAL INTERLOCK AND ARTICLE

BACKGROUND OF THE INVENTION

The present invention relates to a method of joining two materials by mechanical interlock means therebetween and to the resulting article of manufacture. And, more particularly, the invention relates to an improved method of anchoring a polymeric liner or covering to an article such as a pipe fitting, pump part, small tank, valve part, or the like.

Various organic high performance polymeric materials, such as for example tetrafluorethylene (TFE) fluoro polymer, perfluoroalkoxy (PFA) fluoropolymer, and polyolefins, provide such desirable characteristics as high tensile strength, high flex strength, corrosion and wear resistance, low friction, and toughness. However, these materials often lack sufficient rigidity and structural integrity for specific applications unless anchored to a backing of metal, fiber reinforced thermosetting polymer, or other rigid structural material. Metal castings lined with such fluoropolymers provide corrosion resistant parts particularly suitable for service with corrosive chemicals. However, due to the poor bondability of such fluoropolymers, anchoring of a liner or other fluoropolymer component is particularly difficult.

A specific example illustrating the difficulties in anchoring such a liner to a backing of rigid material is that of lining a centrifugal pump casing with a layer of PFA fluoropolymer. The PFA fluoropolymer liner provides excellent corrosion resistance particularly suited for use in pipelines transporting highly corrosive chemicals.

There are several problems with previously available PFA fluoropolymer lined metal pump casings. One cause of such problems is the high shrinkage of the PFA fluoropolymer as it solidifies and cools from its high melt temperature range of 600° to 700° F. during the manufacturing process. The liner is formed over the suction and discharge flanges of the pump and is otherwise restricted from freely shrinking as it cools. This shrinkage creates residual stresses in the liner which cannot be removed and causes the liner to pull away from the metal casing of the pump, thereby reducing dimensional stability. This loosening of the PFA fluoropolymer liner also results in flexing of the liner during pump operation in response to variations of pressure caused by rotation of the pump impeller, potentially causing tearing or cracking.

Attempts to solve these problems by producing a free liner of PFA fluoropolymer and inserting it into a metal pump casing generally result in a poor fit. Furthermore, the PFA fluoropolymer liner cannot be adequately bonded to the metal casing of the pump because of the poor bondability of the fluoropolymer. Attempts to adhere the PFA fluoropolymer liner to the metal casing during the cool-down step of manufacture, either by relying on primer coatings or by adding mechanical locking features such as grooves or welded-in-place perforated metal, result in residual stresses as the liner shrinks away from these restraints. In addition, the adhesion of the liner to the metal casing, with or without the use of a primer, is lost upon subsequent permeation of moisture through the liner during service of the pump. The residual stress and subsequent loosening and flexing of the liner can result in tearing or stress cracking of the liner.

To overcome the problems associated with lining a metal pump casing with PFA fluoropolymer, the inventor has experimented with molding a pump casing of a fiber reinforced thermosetting polymer around a PFA fluoropolymer liner. After thoroughly stress-relieving the PFA fluoropolymer liner by thermal treatment and slow cooling in the free state, the liner has been preheated to the compression mold temperature of the fiber reinforced thermosetting polymer, generally within the range of 250° to 300° F., and subsequently inserted into the mold for forming the casing. A suitable fiber reinforced thermosetting polymer, such as glass fiber reinforced epoxy molding compound, was then molded around the preheated liner.

With this improved technique, the much reduced thermal shrinkage of the PFA fluoropolymer liner when cooling from this relatively low temperature and the reduced differential shrinkage between the liner and the fiber reinforced thermosetting polymer of the pump casing, compared to earlier techniques using a metal pump casing, result in much lower residual stress in the PFA fluoropolymer liner. A pump part produced in this manner provides an improvement over a pump part having a liner directly molded in a metal casing, but it still has some deficiencies. Even though differential shrinkage is reduced, there is still some loosening of the liner from the casing during use. In addition, during pump operation, negative pressure in the suction area of the pump may cause problems with liner flexing and potential tearing or stress cracking.

Another technique for manufacturing a lined structure utilizes polymeric sheets with partially embedded glass fibers protruding from one side. The polymeric sheets are assembled into simple shapes with the glass fibers protruding outward, and a rigid casing is formed over the protruding glass fibers to form a structure having a bonded liner. The glass fibers primarily reinforce the polymeric sheets and, secondarily, provide an interlock between the casing and the polymeric sheets. However, this technique cannot be used when complex shapes are to be formed.

The same difficulties of bonding or anchoring a PFA fluoropolymer, illustrated above with respect to the lining of a fiber reinforced thermosetting polymer pump part, are also encountered with other liner materials, with other armor materials, and with other articles such as pipe fittings, strainer parts, valve parts, small tanks, etc. More generally, the difficulties encountered are those of bonding or anchoring a fluoropolymer, or other organic high performance polymeric material having poor bondability, to another material.

Accordingly, it is an object of the present invention to provide an improved method of joining two materials, one of which is a fluoropolymer or other organic high performance polymeric material having relatively poor bondability.

It is a further object of the present invention to provide an improved method for anchoring a liner or covering to a structure such as, for example, a pipe fitting, pump casing, pump impeller, small tank, valve body, valve plug or the like.

It is still a further object of the present invention to provide an article of manufacture having two materials, one of which being a fluoropolymer or other organic high performance polymeric material, and mechanical interlock means therebetween such that the two materials remain tightly anchored together without the need for a chemical bond therebetween.

SUMMARY OF THE INVENTION

The present invention is directed to a method of joining a material having poor bondability, such as for example a fluoropolymer or other organic high performance polymeric material, to a second material.

The invention is essentially a method of joining together two materials by a mechanical interlock resulting from "chips" at the interface therebetween. The chips, preferably composed of one of the two materials to be joined, are partially embedded in the surface of one of the two materials when that material is formed, as by thermal molding, for example, such that "overhanging" or "angular" surfaces result. Thereafter, the second material is formed over the protruding portions of the chips to establish the mechanical interlock. This technique is particularly useful in anchoring a dissimilar material to an organic high performance polymeric material having poor bondability and/or a high melt temperature such as, for example, fluoropolymers.

The present invention is also directed to a method of forming a liner or covering for an article such as a pump casing, pump impeller, valve body, valve plug, tank, pipe fitting, or the like, by a technique referred to as rotational molding. A finely divided thermally formable material and "chips" are introduced into a substantially enclosed mold. The mold is moved so as to distribute the material and the chips uniformly over the surface of the mold as the material is heated to form a molten layer with the chips partially embedded therein. While the chips are substantially unmelted, the molten layer is cooled to form a solid layer and is removed from the mold and trimmed to provide a finished liner or covering having a relatively smooth front surface and a roughened back surface formed by the protruding of chips therefrom.

The roughened back surface of the liner or covering provides an interlock when a casing or other article is formed against the liner or covering. "Overhanging" surfaces of the chips anchor the liner or covering to the article mechanically such that the liner or covering remains tightly anchored to the article without the need for a chemical bond therebetween. Preferably, the liner or covering is preheated and/or stress-relieved before the article is formed against it so as to minimize residual stress in the resulting structure and to facilitate the accuracy of final dimensions. Alternatively, the chips may be introduced after the finely divided material is at least partially melted to reduce melting of the chips.

Preferably, the material for the "chips" is the same material as that of the liner or covering or other material fusible with that material, such that the chips become fused to the liner or covering. It is also preferred that the chips be formed from scrap material to reduce the cost of the resulting article by reclaiming scrap.

Other aspects of the present invention include articles of manufacture that may be formed by the above methods and related methods employing other molding techniques to achieve this mechanical interlock of chips at the interface of two materials.

The invention, together with further objects and attendant advantages, will be best understood with reference to the following detailed description taken in conjunction with the accompanying drawings.

BRIEF DESCRIPTION OF THE DRAWINGS

FIG. 1 is a sectional view of a pump body made in accordance with the method of the present invention;

FIG. 2 is a pictorial view of the pump body of FIG. 1;

FIG. 4 is a plan view of the liner mold of FIG. 3, with portions broken away;

FIGS. 5-7 and 9-11 are enlarged sectional views showing the steps of joining two materials in accordance with the method of the present invention;

FIG. 8 is a pictorial view of the pump liner of FIG. 3 after being removed from the mold and trimmed to its final configuration; and FIG. 12 is an enlarged, sectional view of an armored pump body showing a second embodiment of the present invention.

DETAILED DESCRIPTION OF THE PREFERRED EMBODIMENTS

Figure 3:
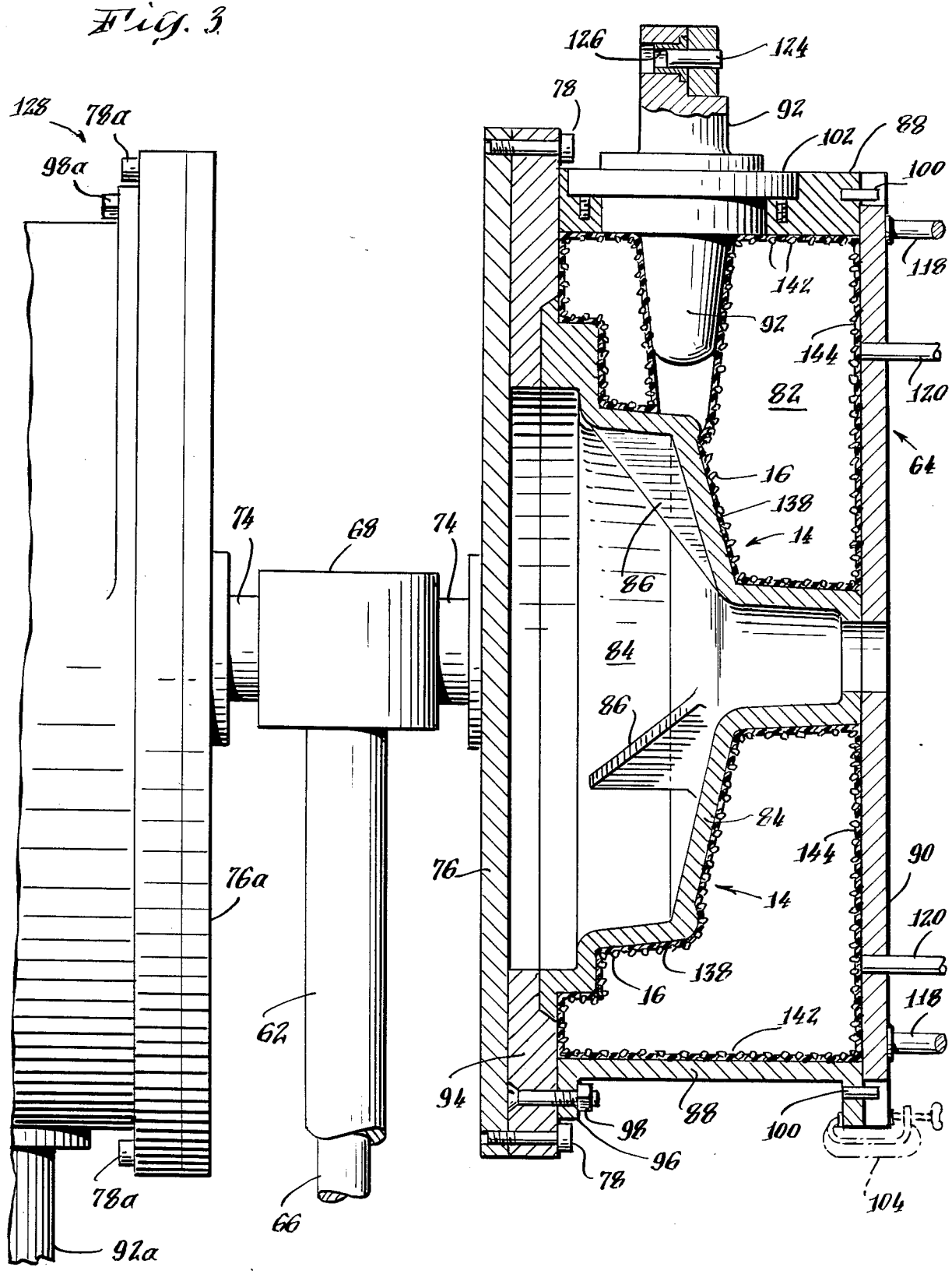
FIG. 3 is an elevational view, in section, of a mold for forming the liner of the pump of FIG. 2 showing an untrimmed liner as molded therein.

The present invention is not limited to a method of manufacturing a lined centrifugal pump body or to rotational molding as a method of forming one of two materials to be joined together. The following description is merely illustrative of the invention and focuses upon the manufacture of a particular centrifugal pump body having a PFA fluoropolymer liner formed by rotational molding.

With reference to the drawings, a centrifugal pump body, indicated generally by the number 10, is shown in section in FIG. 1 and pictorially in FIG. 2. The pump body 10 comprises a pump casing 12 preferably made of fiber reinforced thermosetting polymer, and a pump liner, indicated generally by the numeral 14, made of PFA fluoropolymer. The liner 14 is anchored to the pump casing 12 by "chips" 16 which form a particular mechanical interlock, as discussed more fully below. The pump body 10 includes metal threaded inserts 18 for mounting to flanges of inlet and outlet pipes, not shown, a pump inlet 30, a main cavity 36, and an outlet 37.

A mold, indicated generally by the numeral 64, for forming the pump liner 14, is shown in FIG. 3 as mounted on an arm 62 of a conventional multi-station rotational molding machine. The arm 62 includes an internal shaft 66 which coacts with the external shaft of the arm 62 to effect rotation of the mold 64 along two perpendicular axes, one of which being the axis of the arm 62. Typically, a drive head 68 at the end of the arm 62 includes gear means to effect rotation of a spider shaft 74 about its axis perpendicular to the axis of the arm 62. A spider 76 is bolted to the spider shaft 74 for mounting of the mold 64.

The mold 64 is affixed to the spider 76 by a series of cap screws 78 regularly spaced along its circumference. As shown in FIGS. 3 and 4, the mold 64 has an enclosed mold chamber 82 having a substantially donut-like configuration. The inside surface of the main cavity 36 of the liner 14 is formed by a main cavity plug 84 having reinforcement ribs 86 to provide added rigidity. The balance of the mold chamber 82 is enclosed by a generally cylindrical mold side wall 88 and a disc-shaped mold door 90. A removable outlet core 92 provides the desired configuration for the pump outlet 37.

A clamping plate 94 is secured to a flange 96 of the mold side wall 88 by bolts 98 regularly spaced along its circumference. A plurality of alignment pins 100 ensure proper registration of the mold door 90 with respect to the side wall 88. The mold door 90 is clamped against the main cavity plug 84 and to the mold side wall 88 by a series of C-clamps 104 engaging a flange 106 of the mold side wall 88, as indicated in FIG. 4. The outlet core 92 is mounted on a side wall insert 102 and is clamped and sealed within the side wall 88 such that it engages the main cavity plug 84.

Preferably, the mold 64 also includes door handles 118 for convenience in placing the mold door 90 upon the mold side walls 88 and for transporting the mold 64. Vent tubes 120 of tetrafulorethylene (TFE) fluoropolymer, plugged with glass wool or steel wool, are inserted through the mold door 90 to provide venting during the molding process and to equalize pressure during cooling. A long handle 122 is pivotally mounted on the outlet core 92 by a dowel 124 and bushing 126 to provide leverage for installing and removing the outlet core 92.

A second mold 128, having corresponding elements 76a, 78a, 98a and 92a, is mounted on the spider shaft 74 opposite the mold 64 to balance the arm 62 and improve productivity. The molds 64 and 128 are made of a metal having a suitably high thermal conductivity and have a substantially uniform wall thickness to ensure uniform heating of the interior surfaces of the molds. Aluminum is preferred due to its high thermal conductivity, moderate cost, and ease of fabrication by casting, machining or welding. A wall thickness of ½ inch has been found satisfactory for an aluminum mold of this type.

In preparation for molding, the molds 64 and 128 are cleaned and a suitable release agent is applied to the mold surface. The molds 64 and 128 are then charged with a preweighed quantity of finely divided PFA fluoropolymer particles 130 and coarsely divided "chips" 132, shown most clearly in FIG. 5. The molds are then closed by clamping the doors 90 and 90a in place with the C-clamps 104. Preferably, the molds 64 and 128 remain affixed to the arm 62 throughout the molding process, the arm 62 being rotated to position the molds for charging with the particles 130 and the "chips" 132.

The size and shape of the fluoropolymer particles affect the uniformity of the deposited layer. Preferably, the particles are free-flowing and are finely divided, having a particle size of 35 mesh and below. The coarsely divided chips 132 may be, for example, ⅛ inch to ¼ inch in size and may be of various materials. Since some of the chips 132 may penetrate through the wall of the liner 14, it is preferred that the material of the chips 132 has physical properties generally comparable to that of the material of the particles 130. It is also preferred that the chips 132 are fusible to the PFA fluoropolymer of the particles 130. Particular advantages result if the chips 132 and the particles 130 are of the same material.

Suitable PFA fluoropolymers for the particles 130, such as those marketed as Teflon by DuPont De Nemours of Wilmington, Del., are generally available. The chips 132 may be of the same fluoropolymer or of other materials that may be convenient. Suitable release agents for such fluoropolymers are commercially available. The chips 132 may be pieces of scrap material, chopped or otherwise divided to a suitable size, to reduce the cost of the resulting article of manufacture by minimizing costs of procurement, storage, and disposal of materials.

The charged molds 64 and 128 are indexed into an oven preheated to a desired molding temperature dependent upon the material of the particles 130, typically 600°-700° F. As the molds 64 and 128 are heated and rotated biaxially, the PFA fluoropolymer powder melts and builds up a molten layer 134 of uniform thickness conforming to the metal mold configuration which it contacts, with substantially unmelted chips 136, as shown in FIG. 6. The inventor has found that suitable rotation speeds for the arm 62 and the spider shaft 74 are 8 rpm and 10 rpm, respectively.

The rotational molding process is such that the smaller particles melt first and adhere to the mold wall. The chips 136 progressively melt at their surfaces and in turn adhere to the previously molten layer 134. For this reason, the chips 136 remain in a loose state until nearly all the particles 130 are adhered to the mold wall. At this point, the chips 136 become embedded in the viscous melt and are fused thereto if the chips 132 are of a fusible material, as preferred. If a melt processable fluoropolymer such as PFA is used for the chips 132, there is a tendency for the chips 132 to become somewhat rounded, depending upon the time and temperature required to melt the particles 130, but the chips 132 do not lose their basic shape.

The chips 132 may be added at the end of the melting operation but, more conveniently, can be added initially with the charge of the particles 130. At least some of the chips 132 have "angularity", meaning that some of the surfaces thereof form an acute angle with the plane between the two materials to be joined, i.e., that some surfaces of the chips 132 "overhang" the molten layer 134. A loss in this angularity during the molding process can be offset by using larger pieces for the chips 132 or by starting with pieces having greater angularity or by using a "cluster technique" of prebonding several pieces together. Although each of the chips 132 need not have surfaces which overhang the molten layer 134, some residual angularity of the chips 132 is important to the mechanical interlock formed between the liner 14 and the casing 30, as discussed below.

As soon as the particles 130 have formed the molten layer 134, and before the chips 132 lose their basic shape, the arm 62 is indexed to a cooling station. While still rotating about the arm 62 and the spider shaft 74, the molds 64 and 128 are cooled by fan air or water spray until the molten layer 134 solidifies to form a wall 138 of the liner 14 with residual chips 16 embedded therein, as shown in FIG. 7.

When the wall 138 is sufficiently cooled, the arm 62 is indexed to an unloading station where the mold doors 90 and 90a and the main cavity plugs 84 and 84a are removed from the molds 64 and 128 together with substantially donut-shaped molded articles. Portions 142 and 144 of the molded wall 138, formed by the mold side wall 88 and the mold door 90, respectively, are then trimmed away as scrap to leave an inlet flange 146, an outlet flange 148, and a rear mounting flange 150, as indicated by a comparisonl of FIGS. 1 and 3. FIG. 8 shows the completed liner 14, pictorially, one such liner being produced by each mold. The trimmed scrap is suitable for the formation of chips for subsequent manufacture of liners similar to the liner 14.

The resulting liner 14 has a relatively smooth front surface and a roughened back surface formed by the protruding of the chips 16. Residual angularity of the chips 16 provides overhanging surfaces with respect to the plane between the two materials to be joined such that a suitable material may be tightly anchored to the back surface of the liner by a molding operation. Preferably, the liner 14 is stress-relieved by thermal treatment, is preheated to a compression mold temperature of 250°–300° F., and is placed in a compression mold 151. A glass fiber filled epoxy molding compound 152 is then compression molded against the liner 14 to form the casing 12, as indicated in FIGS. 9–11.

The mechanical interlock provided by the chips 16 anchors the casing 12 to the liner 14 so tightly that peel strengths of 50–75 pounds per inch of width have been achieved by this process with the particular materials specified above. The anchoring is so positive that many of the chips 140 are pulled into two pieces with their halves remaining in each material. Because this anchoring method is mechanical rather than chemical, it is not subject to weakening due to possible moisture penetration. The same anchoring method can be employed in a wide range of applications when two materials, one of which having relatively poor bondability, are to be joined together.

A second embodiment of the present invention, shown in FIG. 12, also employs a liner 154 with chips 156 bonded to the backside thereof by rotational molding, as discussed above, or other means to embed the chips within the base material. However, the liner 154 is then inserted into a pre-made armor body 158. A third material 160 that is capable of bonding to the armor material and also capable of closely enclosing the protruding portions of the chips 156 is then introduced between the liner 154 and the armor body 158. The third material 160 may be an adhesive, rubber, or epoxy molding compound, or the like.

It is possible to achieve this joining together of two materials without employing rotational molding. For example, the chips 16 may be added to a material formed in an open mold or to a material softened sufficiently after being formed in a fixed, closed mold. In other applications of this method, an additional step may be required to bond the chips 16 to the backside of the liner wall 138 by the use of an additional layer of material. An example of this latter method would be a poly-tetrafluorethylene (PTFE) fluoropolymer liner with chips bonded to the backside thereof by means of an intermediate layer of melted PFA fluoropolymer prior to molding of an article against the liner.

Of course, it should be understood that various changes and modifications to the preferred embodiment described above will be apparent to those skilled in the art. For example, the described method of making a pump body having a PFA fluoropolymer liner and a fiber reinforced thermosetting polymer casing would work equally well with other liner materials, other armor materials, other molding techniques, and other articles. Such changes and modifications can be made without departing from the spirit and scope of the present invention, and it is therefore intended that such changes and modifications be covered by the following claims.

What is claimed is:

1. A method of joining two materials comprising the steps of:
   providing a molten layer of a first material;
   adding coarsely divided chips of a material fusible with the first material;
   solidifying the molten layer of the first material such that the chips are fused to the first material and are partially embedded therein and protrude therefrom so as to provide surfaces which overhang a solidified layer of the first material; and
   forming a second material over the solidified layer of the first material and the protruding chips such that the second material closely fits against the overhanging surfaces of the protruding chips to provide a mechanical interlock between the first material and the second material.

2. A method of joining two materials comprising the steps of:
   providing finely divided particles of a first material;
   providing coarsely divided chips of a material fusible with the first material;
   combining the finely divided particles and the chips;
   heating the finely divided particles and the chips to effect fusing and to form a molten layer with the chips substantially unmelted therein;
   cooling the molten layer so as to form a solidified layer of the first material with the chips fused therein and protruding therefrom so as to provide surfaces which overhang the solidified layer of the first material; and
   forming a second material over the solidified layer of the first material and the protruding chips such that the second material closely fits against the overhanging surfaces of the protruding chips to provide a mechanical interlock between the first material and the second material.

3. A method of forming a lined/covered article comprising the steps of:
   providing a substantially enclosed mold having an inner surface corresponding to a desired surface of the lined/covered article;
   introducing finely divided meltable particles into the mold;
   introducing coarsely divided chips into the mold;
   moving the mold so as to distribute the particles and the chips uniformly;
   heating the mold as the mold is moved so as to melt the particles and form a molten layer while leaving the chips substantially unmelted;
   cooling the mold such that the molten layer forms a solid layer with the chips embedded therein and projecting therefrom so as to provide surfaces which overhang the solid layer;
   removing the solid layer with the chips embedded therein from the mold;
   cutting away a portion of the solid layer to form a liner/covering having a relatively smooth front surface and a roughened back surface formed by the protruding of the chips therefrom; and
   forming a material against the liner/covering such that the second material closely fits against the overhanging surfaces of the protruding chips to provide a mechanical interlock between the liner/covering and the material.

4. The method of claim 3 wherein the step of introducing the chips is carried out after the finely divided meltable particles are at least partially melted.

5. The method of claim 3 further comprising the steps of preheating the liner/covering to a predetermined temperature placing the liner/covering in a mold for forming the lined/covered article, and molding the material in the mold at said predetermined temperature so as to establish the mechanical interlock between the liner and the article.

6. The method of claim 3 further comprising the step of dividing scrap material of the liner/covering material to form the chips.

7. The method of claim 3 further comprising the step of fusing the finely divided meltable particles and the chips, the chips being formed of a material fusible with the finely divided meltable material.

8. A method of forming a liner or covering for an article, comprising the steps of:
   providing a substantially enclosed mold having an inner surface corresponding to a desired surface of the lined or covered article;
   introducing fluoropolymer particles into the mold;
   introducing coarsely divided fluoropolymer chips into the mold;
   rotating the mold so as to distribute the particles and the chips uniformly;
   heating the mold as the mold is being rotated so as to melt the particles and form a molten layer of uniform thickness while leaving the chips substantially unmelted;
   cooling the mold such that the molten layer forms a solid layer with the chips embedded therein and protruding therefrom so as to provide surfaces which overhang the solid layer;
   removing the solid layer with the chips embedded therein from the mold; and
   cutting away a portion of the solid layer to form a liner or covering having a relatively smooth front surface and a roughened back surface formed by the protruding of the chips therefrom, the protruding chips being engageable with the article to provide a mechanical interlock therewith.

9. The method of claim 8 with the step of introducing the coarsely divided chips being carried out after said particles are at least partially melted.

10. The method of claim 8 further comprising the step of fusing the fluoropolymer particles and the fluoropolymer chips, the chips being formed of a fluoropolymer fusible with the fluoropolymer powder.

11. The method of claim 8 further comprising the step of dividing scrap material of the same polymer used to form the liner, to form the chips.

12. A method of forming an article having a liner/covering, comprising the steps of:
   providing a mold having a surface corresponding to a desired surface of the article;
   introducing fluoropolymer particles into the mold;
   introducing coarsely divided chips into the mold, the chips being composed of the same fluoropolymer as that of said particles;
   heating the mold to a sufficiently high temperature and for a sufficiently long period of time to melt the particles and fuse the chips so as to form a molten layer with the chips partially embedded therein;
   cooling the mold while the chips are substantially unmelted such that the molten layer solidifies to form a solid layer with the chips fused therein and protruding therefrom with residual angularity with respect to the solid layer;
   removing the solid layer with the chips fused therein from the mold; and
   molding a fiber reinforced thermosetting polymer over the solid layer to provide added rigidity and structural integrity, the thermosetting polymer being formed against the residual angularity of the chips so as to anchor the fiber reinforced thermosetting polymer to the solid layer.

13. The method of claim 12 further comprising the step of dividing scrap material of the same fluoropolymer as that of said particles to form the chips.

14. The method of claim 12 further comprising the steps of rotating the mold as it is being heated and cooled to distribute the particles and chips uniformly over an enclosed surface of the mold and form a hollow structure with the chips protruding inward, and trimming away a portion of the hollow structure to form a liner/covering having a relatively smooth front surface and a roughened back surface having the chips protruding therefrom.

15. A layered article of manufacture comprising:
   a first layer of thermally formable polymeric material;
   a second layer of a different material overlying the first layer; and
   chips of thermally formable polymeric material embedded within and fused to the first layer such that the chips partially protrude therefrom and provide surfaces which overhang the first layer so as to form a mechanical interlock between the first and second layers to hold the first and second layers together.

16. The article of manufacture of claim 15 wherein the first layer is formed of a fluoropolymer and the chips are formed of the same fluoropolymer.

17. A lined/covered article, comprising:
   a liner/covering having a front portion formed of a thermally formable polymeric material providing a surface of the lined/covered article, and a back portion having a plurality of chips of a thermally formable polymeric material partially embedded within the front portion and fused thereto such that portions of the chips protrude from the front portion to provide surfaces that overhang the front portion; and
   a body formed against the back surface of the liner/covering such that the body closely fits over the overhanging portions of the protruding portions of chips and is anchored to the liner/covering by a mechanical interlock between the body and the protruding portions of the chips.

18. The lined/covered article of claim 17 wherein the liner/covering is formed of a fluoropolymer and the chips are also formed of a fluoropolymer.

19. The lined/covered article of claim 18 wherein the chips and the liner/covering are composed of the same fluoropolymer, that fluoropolymer being composed of a group including tetrafluorethylene (TFE) and perfluoroalkoxy (PFA) fluoropolymers.

20. The lined/covered article of claim 17 wherein the body is composed of a thermosetting polymer material and includes glass fibers to provide added rigidity and structural integrity to the lined/covered article.

21. A lined article comprising:
   a liner composed of a fluoropolymer, having a front surface forming an inner surface of the lined article and a roughened back surface, the back surface having protruding portions having surfaces providing overhang with respect to adjacent portions of the back surface; and
   a body composed of fiber reinforced thermosetting polymer formed against the back surface of the liner such that the body closely fits over the overhanging surfaces of the protruding portions of the liner to provide a mechanical interlock between the body and the liner.

22. The lined article of claim 21 wherein the liner is composed of a group of fluoropolymers including tetrafluorethylene (TFE) and perfluoroalkoxy (PFA).

23. A method of joining two materials comprising the steps of:

providing a molten layer of a first material;

adding coarsely divided chips of a material fusible with the first material;

solidifying the molten layer of the first material such that the chips are fused to the first material and are partially embedded therein and protrude therefrom so as to provide surfaces which overhang a solidified layer of the first material;

providing a layer of a second material in proximity to the protruding chips of the solidified layer of the first material such that a space is provided between the layer of the first material and the layer of the second material; and introducing a third material into the space between the solidified layer of the first material and the layer of the second material such that the third material encloses the overhanging surfaces of the protruding chips and bonds to the second material to join the first material and the second material.

24. A layered article of manufacture comprising:

a first layer of thermally formable polymeric material;

a second layer of a different material overlying the first layer;

chips of thermally formable polymeric material embedded within and fused to the first layer such that the chips partially protrude therefrom and provide surfaces which overhang the first layer; and a third layer of material between the first layer and the second layer bonded to the second layer and enclosing the protruding portions of the chips so as to form a mechanical interlock between the first and second layers to hold the first and second layers together.

* * * * *